United States Patent
Qi et al.

(10) Patent No.: US 10,868,667 B2
(45) Date of Patent: Dec. 15, 2020

(54) BLOCKCHAIN ENHANCED V2X COMMUNICATION SYSTEM AND METHOD

(71) Applicant: GM Global Technology Operations LLC, Detroit, MI (US)

(72) Inventors: Jimmy Qi, Shanghai (CN); Richard Liu, Shanghai (CN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 108 days.

(21) Appl. No.: 16/181,945

(22) Filed: Nov. 6, 2018

(65) Prior Publication Data
US 2020/0145191 A1    May 7, 2020

(51) Int. Cl.
| | |
|---|---|
| H04L 9/06 | (2006.01) |
| H04W 4/40 | (2018.01) |
| H04W 4/021 | (2018.01) |
| H04W 12/06 | (2009.01) |
| H04L 9/32 | (2006.01) |
| H04W 4/02 | (2018.01) |

(52) U.S. Cl.
CPC .......... *H04L 9/0637* (2013.01); *H04L 9/3247* (2013.01); *H04W 4/021* (2013.01); *H04W 4/023* (2013.01); *H04W 4/40* (2018.02); *H04W 12/06* (2013.01); *H04L 2209/38* (2013.01)

(58) Field of Classification Search
CPC . H04L 9/0637; H04L 9/3247; H04L 2209/38; H04W 4/40; H04W 4/021; H04W 4/023; H04W 12/06

USPC ........................................................ 713/155
See application file for complete search history.

(56) References Cited

U.S. PATENT DOCUMENTS

| | | | |
|---|---|---|---|
| 2008/0063003 A1* | 3/2008 | O'Neal | H04L 65/4076 370/408 |
| 2018/0374283 A1* | 12/2018 | Pickover | G07C 5/085 |
| 2019/0007484 A1* | 1/2019 | Chen | H04W 4/46 |
| 2019/0025817 A1* | 1/2019 | Mattingly | H04L 9/0825 |
| 2019/0025818 A1* | 1/2019 | Mattingly | G05D 1/0027 |

(Continued)

FOREIGN PATENT DOCUMENTS

| | | | |
|---|---|---|---|
| CN | 108737534 A | * | 11/2018 |
| WO | 2018-77650 B | * | 1/2018 |

(Continued)

*Primary Examiner* — Taghi T Arani
*Assistant Examiner* — Badri Champakesan

(57) ABSTRACT

An authentication system for V2X communication systems includes a first node having a V2X communication module with a processor, a memory, and input/output ports communicating a request to join and periodically communicating a first data packet to the V2X communication system. The authentication system having a private blockchain including a plurality of participant nodes within a predefined optimized area of one another, the blockchain receiving and validating the request to join the V2X communication system, and upon successfully validating the request to join the V2X communication system, periodically sending a second data packet from the plurality of participant nodes to the first node. The input/output ports receiving the second data packet, the processor executing a first control logic stored in the memory to extract the second data packet and a second control logic selectively generating a notification based on the contents of the second data packet.

16 Claims, 4 Drawing Sheets

(56) References Cited

U.S. PATENT DOCUMENTS

| | | | |
|---|---|---|---|
| 2019/0116034 A1* | 4/2019 | Sengupta | H04L 9/30 |
| 2019/0208418 A1* | 7/2019 | Breu | H04L 9/3239 |
| 2019/0279210 A1* | 9/2019 | Pen | H04L 9/0637 |
| 2019/0318353 A1* | 10/2019 | Castinado | H04L 9/0637 |
| 2019/0378352 A1* | 12/2019 | Dey | G07C 5/008 |
| 2020/0029268 A1* | 1/2020 | Russell | H04W 12/0609 |
| 2020/0045552 A1* | 2/2020 | Kim | H04W 48/02 |
| 2020/0065811 A1* | 2/2020 | Sloane | G06Q 20/4014 |
| 2020/0079319 A1* | 3/2020 | Zeryihun | B60R 25/01 |
| 2020/0126321 A1* | 4/2020 | Swearingen | G06F 21/64 |
| 2020/0137165 A1* | 4/2020 | Garg | H04L 9/3239 |

FOREIGN PATENT DOCUMENTS

| | | | |
|---|---|---|---|
| WO | 2018-99285 | * | 1/2018 |
| WO | 2018-581931 | * | 1/2018 |
| WO | 2019-A2646 | * | 1/2019 |

* cited by examiner

BLOCKCHAIN ENHANCED V2X COMMUNICATION SYSTEM AND METHOD

The statements in this section merely provide background information relating to the present disclosure, and may not constitute prior art.

The present disclosure relates generally to motor vehicles, and more specifically to communications systems equipped to and used by motor vehicles having vehicle-to-vehicle (V2V), vehicle-to-infrastructure (V2I), or more generally, vehicle-to-everything (V2X) communication capabilities. Typical V2X equipped vehicles generate, receive, and communicate data relating to a wide variety of parameters, such as location, weather, traffic, and other such information. In order to ensure that the V2X communications are reliable and trustworthy, security measures are required. Typical security measures include authentication mechanisms including certificates generated and provided by third party certificate authority (CA) organizations or providers. However, the use of a third party CA organization to provide some of the security necessary to operate a trustworthy V2X system for motor vehicles can increase cost, reduce flexibility and scalability, and can also reduce a quantity and quality of the V2X data sent across a V2X network. Accordingly, there is a need in the art for new and improved systems and methods for V2X communication for motor vehicles that effectively and efficiently provide secure authentication for V2X devices while reducing cost, complexity, and improving flexibility, scalability, and maintaining or improving security.

SUMMARY

According to several aspects an authentication system for a vehicle to everything (V2X) communication system includes a first participant node, the first participant node having a V2X communication module with a processor, a memory, and input/output ports, the input/output ports communicating a request to join the V2X communication system, and the input/output ports periodically communicating a first data packet to the V2X communication system. The authentication system for a V2X communication system further includes a private blockchain including a plurality of participant nodes within a predefined optimized physical area of one another, the private blockchain receiving the request to join the V2X communication system from the first participant node, the private blockchain validating the request to join the V2X communication system, and upon successfully validating the request to join the V2X communication system, the private blockchain periodically sends a second data packet from the plurality of participant nodes to the first participant node. The input/output ports receiving the second data packet, the processor executing a first control logic stored in the memory to extract the second data packet and a second control logic selectively generating a notification based on the contents of the second data packet.

In another aspect of the present disclosure the first data packet and the second data packet each include a V2X message and a digital signature.

In yet another aspect of the present disclosure the V2X message includes a position, a speed, an acceleration, a direction, a time, and safety event information, and the digital signature includes a blockchain header, a hash code, and a public key.

In yet another aspect of the present disclosure an authentication system for a V2X communication system of includes a public blockchain having a plurality of decentralized computing resources, and the first and second data packets are selectively forwarded to the public blockchain when computing resources of the private blockchain are below a predetermined threshold value.

In yet another aspect of the present disclosure the public blockchain includes a plurality of private blockchains.

In yet another aspect of the present disclosure the decentralized computing resources of the public blockchain are remotely located from the participant nodes of the private blockchain, and remotely located from the plurality of private blockchains.

In yet another aspect of the present disclosure the processor executes a third control logic determining a physical location of the first participant node in relationship to the predefined optimized physical area and dynamically unregistering the first participant node when the first participant node is no longer within the predefined optimized physical area, and the processor executes a fourth control logic selectively adding the first participant node to a list of untrusted resources when the request to join the V2X communication system is not successfully validated.

In yet another aspect of the present disclosure the first participant node includes a motor vehicle, a pedestrian, a cyclist, a mobile device, or a grid infrastructure device.

In yet another aspect of the present disclosure the second control logic further includes selectively generating a notification to a human-machine interface (HMI) of the first participant node, and selectively performing an advanced driver assistance system (ADAS) function based on the contents of the second data packet.

In yet another aspect of the present disclosure a method of authentication for a vehicle to everything (V2X) communication system includes generating a request to join the V2X communication system within a communication module of a first participant node, the communication module having a processor, a memory, and input/output ports; communicating the request to join the V2X communication system from the input/output ports of the first participant node; periodically communicating a first data packet to the V2X communication system from the input/output ports of the communication module of the first participant node; receiving the request to join and the first data packet within a private blockchain including a plurality of participant nodes within a predefined optimized physical area of one another; validating the request to join the V2X communication system within the private blockchain; selectively joining the first participant node to the private blockchain upon successfully validating the request to join; periodically sending a second data packet generated by the plurality of participant nodes of the private blockchain to the first participant node; receiving the second data packet with the input/output ports of the first participant node; extracting the second data packet within the processor of the V2X communication module of the first participant node, and selectively generating a notification based on the contents of the second data packet.

In yet another aspect of the present disclosure the first data packet and the second data packet include a V2X message and a digital signature.

In yet another aspect of the present disclosure the V2X message includes a position, a speed, an acceleration, a direction, a time, and safety event information, and the digital signature includes a blockchain header, a hash code, and a public key.

In yet another aspect of the present disclosure a method of authentication for a V2X communication system further includes selectively forwarding the first data packet and the second data packet to a public blockchain having a plurality of decentralized computing resources when computing resources of the private blockchain are below a predetermined threshold value.

In yet another aspect of the present disclosure the public blockchain includes a plurality of private blockchains.

In yet another aspect of the present disclosure the decentralized computing resources of the public blockchain are remotely located from the participant nodes of the private blockchain, and remotely located from the plurality of private blockchains.

In yet another aspect of the present disclosure a method of authentication for a V2X communication system further includes determining a physical location of the first participant node in relationship to the predefined optimized physical area and dynamically unregistering the first participant node when the first participant node is no longer within the predefined optimized physical area.

In yet another aspect of the present disclosure the first participant node includes a motor vehicle, a pedestrian, a cyclist, a mobile device, or a grid infrastructure device.

In yet another aspect of the present disclosure a method of authentication for a V2X communication system further includes generating a notification to a human-machine interface (HMI) of the first participant node, and selectively performing an advanced driver assistance system (ADAS) function based on the contents of the second data packet.

In yet another aspect of the present disclosure a method of authentication for a V2X communication system further includes selectively adding the first participant node to a list of untrusted resources when the request to join the V2X communication system is not successfully validated.

In yet another aspect of the present disclosure a method of authentication for a vehicle-to-everything (V2X) communication system includes generating a request to join the V2X communication system within a communication module of a first participant node, the communication module having a processor, a memory, and input/output ports; communicating the request to join the V2X communication system from the input/output ports of the first participant node; periodically communicating a first data packet to the V2X communication system from the input/output ports of the communication module of the first participant node; receiving the request to join and the first data packet within a private blockchain including a plurality of participant nodes within a predefined optimized physical area of one another; validating the request to join the V2X communication system within the private blockchain; selectively joining the first participant node to the private blockchain upon successfully validating the request to join; selectively adding the first participant node to a list of untrusted resources when the request to join the V2X communication system is not successfully validated; periodically sending a second data packet generated by the plurality of participant nodes of the private blockchain to the first participant node, the first data packet and the second data packet each include a V2X message including a position, a speed, an acceleration, a direction, a time, and safety event information, and a digital signature including a blockchain header, a hash code, and a public key; selectively forwarding the first data packet and the second data packet to a public blockchain having a plurality of decentralized computing resources when computing resources of the private blockchain are below a predetermined threshold value, the public blockchain including a plurality of private blockchains, and the decentralized computing resources of the public blockchain are remotely located from the participant nodes of the private blockchain, and remotely located from the plurality of private blockchains; receiving the second data packet with the input/output ports of the first participant node; extracting the second data packet within the processor of the V2X communication module of the first participant node; selectively generating a notification to a human-machine interface (HMI) of the first participant node, and selectively performing an advanced driver assistance system (ADAS) function based on the contents of the second data packet determining a physical location of the first participant node in relationship to the predefined optimized physical area and dynamically unregistering the first participant node when the first participant node is no longer within the predefined optimized physical area.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

Figure 1:
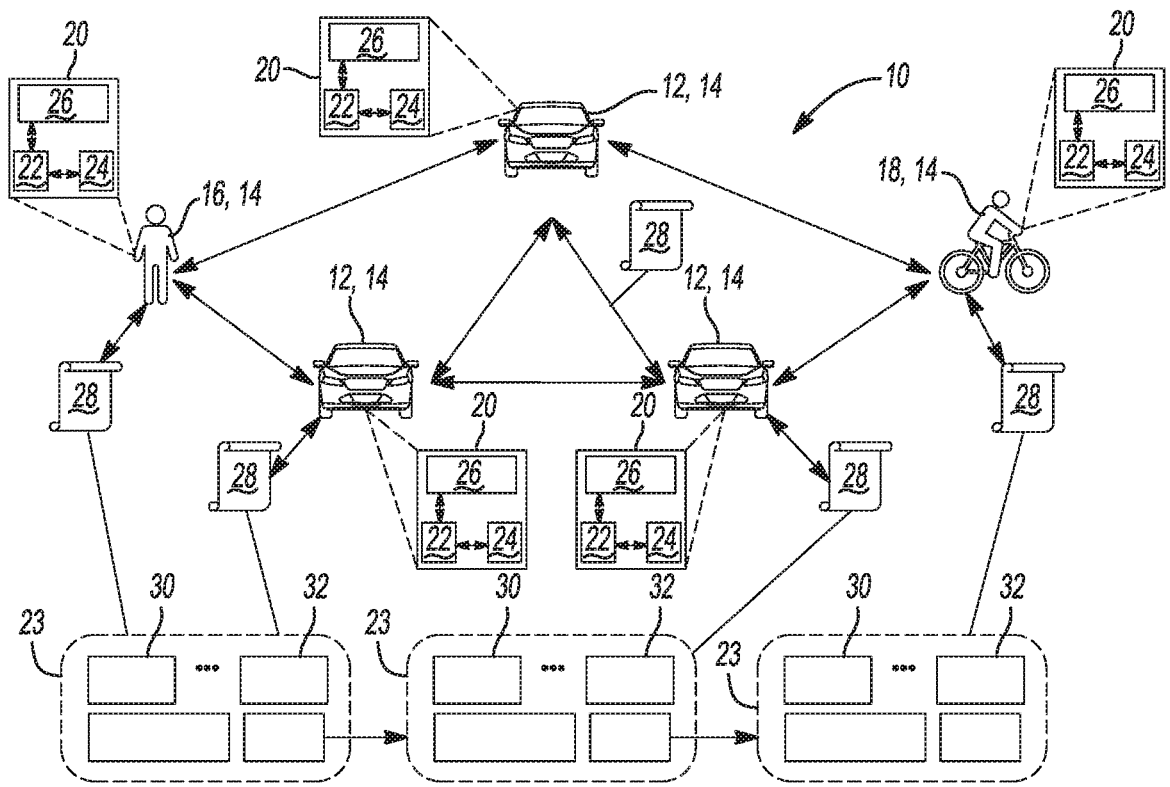
FIG. 1 is a schematic diagram of a blockchain enhanced V2X system according to an aspect of the present disclosure.

Reference will now be made in detail to several embodiments of the disclosure that are illustrated in accompanying drawings. Whenever possible, the same or similar reference numerals are used in the drawings and the description to refer to the same or like parts or steps. These and similar directional terms are not to be construed to limit the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises", "includes," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "disposed on," "connected to," or "coupled to" another element or layer, it may be directly on, engaged, disposed, connected or coupled to the other element or layer, or intervening elements or layers may be present. In contrast, when an element is referred to as being "directly on," "directly engaged to," "directly disposed on," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

The term "computer" or "controller" as used herein generally includes any electronic control device having a preprogrammed digital computer or processor, memory or non-transitory computer readable medium used to store data such as control logic, software applications, instructions, computer code, software, or applications, data, lookup tables, etc., and a transceiver (or input/output ports). Computer readable medium includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device. Computer code, software, or applications includes any type of program code, including source code, object code, and executable code. The processor is configured to execute the code or instructions. In some examples, the computer or server also includes a dedicated Wi-Fi controller configured to wirelessly communicate with wireless communications hotspots using Wi-Fi protocols under IEEE 802.1X.

The computer or server further includes one or more applications. An application is a software program configured to perform a specific function or set of functions. The application may include one or more computer programs, software components, sets of instructions, procedures, functions, objects, classes, instances, related data, or a portion thereof adapted for implementation in a suitable computer readable program code. The applications may be stored within the memory or in additional or separate memory. Examples of the applications include audio or video streaming services, games, browsers, social media, network management systems, directory access and management systems, and the like, without departing from the scope or intent of the present disclosure.

The following description is merely exemplary in nature and is not intended to limit the present disclosure, application, or uses.

Referring to FIG. 1 a system for use with vehicle-to-everything (V2X) communication enabled endpoints or nodes is shown and indicated generally by reference number 10. V2X communications generally fall into at least one of vehicle-to-infrastructure (V2I), vehicle-to-vehicle (V2V), vehicle-to-pedestrian (V2P), vehicle-to-device (V2D), and vehicle-to-grid (V2G) types. More generally, V2X communication is the passing of information from a motor vehicle 12 to any entity that may affect the motor vehicle 12, and vice versa. V2X communication technology is generally wireless local area network (WLAN), or cellular communication based. In several aspects, V2X systems and technology operate to form a wireless ad hoc network (WANET) or a wireless vehicular ad hoc network (VANET) when the V2X systems are enabled and used with motor vehicles on roads. WANETs and VANETs are decentralized forms of wireless network and are known as "ad hoc" because both WANETs and VANETs do not rely on pre-existing infrastructure, such as routers in wired networks or access points in managed infrastructure wireless networks. Each device on the WANET or VANET is known as a node 14. In several aspects, the motor vehicles 12 on the VANET of this disclosure are nodes 14 in the V2X network. The motor vehicles 12 are cars, trucks, vans, semis, autocycles, motorcycles, or any other like motor vehicle 12. However, it should be appreciated that the nodes 14 may include pedestrians 16, cyclists 18, mobile devices (not specifically shown), or grid infrastructure devices (not specifically shown) without departing from the scope or intent of the present disclosure.

The nodes 14 participate in routing information by forwarding data for other nodes 14. Thus, the determination of which nodes 14 forward data is made dynamically on the basis of network connectivity, and the routing algorithm currently in use. In some examples, and as will be discussed in more detail herein, the routing algorithm uses proximity and/or location of a given node 14 in relation to other known nodes 14 to determine whether and how information routing will occur.

Each of the V2X equipped nodes 14 includes a V2X communication module 20. The V2X communication module 20 is an electronic control device having a preprogrammed digital computer or processor 22, memory 24 or non-transitory computer readable medium used to store data such as control logic, software applications, instructions, computer code, software, or applications, data, lookup tables, etc., and a transceiver (or input/output ports) 26. The computer readable medium includes any type of medium capable of being accessed by a computer, such as read only memory 24 (ROM), random access memory (RAM) 24, a hard disk drive, a compact disc (CD), a digital video disc (DVD), or any other type of memory 24. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device. Computer code, software, or applications includes any type of program code, including source code, object code, and executable code. The processor 22 is configured to execute the code or instructions. In some examples, the V2X communication module 20, computer or server also includes a dedicated Wi-Fi or cellular network controller configured to wirelessly communicate with wireless communications hotspots using Wi-Fi protocols under IEEE 802.1X, or cellular networks.

In several aspects, the system 10 includes a blockchain based V2X decentralized certificate authority (CA) in place of a third party CA. A blockchain based V2X CA provides an open, distributed ledger that can record transactions between multiple parties efficiently, and in a verifiable and permanent way. The blockchain based V2X CA is typically managed on a peer-to-peer network collectively adhering to a protocol for inter-nodal communication and validation of new blocks 23 within the blockchain. Once recorded, the data in any given block cannot be altered retroactively without alteration of all subsequent blocks 23, which requires consensus of a network majority. Although blockchain records themselves are not unalterable, blockchains are secure by design and exemplify a distributed computing system with high *Byzantine* fault tolerance. Blocks 23 within the blockchain holds batches of valid transactions that are hashed and encoded into a Merkle tree. Each block includes the cryptographic hash of the prior block in the blockchain, thereby linking the two. The linked blocks 23 form a chain. The iterative process confirms the integrity of the previous block all the way back to an original genesis block. The blockchain based V2X CA allows a significant level of decentralization of resources and security. That is, by storing data across the peer-to-peer network, the blockchain eliminates risks such as centralized points of vulnerability, and central points of failure. Additionally, by utilizing a blockchain based V2X CA in place of the third party CA, the need to use, generate, or otherwise procure a certificate from a third party CA is eliminated. Thus, the blockchain based V2X system 10 operates as a real-time distributed V2X messaging communication system with decreased cost and increased efficiency over traditional third party CA authenticated V2X systems 10. More specifically, the blockchain based V2X system 10 of the present disclosure reduces costs by using blockchain based authentication mechanisms without the need to include a third party organization in the authentication process.

The blockchain based V2X system 10 reduces hardware and other infrastructure costs while improving data throughput and providing both forward and reverse compatibility for connected nodes 14 in the system 10. In several aspects, the reduced hardware and infrastructure costs stem from a reduced message size. In one example, a message or data packet 28 generated by the blockchain based V2X system 10 includes both a header 30 and safety data 32 with cryptographic features having a combined size of about 80 bytes. In an example of a non blockchain-based V2X system 10, the need to use a certificate from a third party CA tends to increase the size of the header 30 in particular. Accordingly, in the non-blockchain based V2X system 10, the overall data packet 28 size is about 140 bytes. Accordingly, a blockchain based V2X system 10 of the present disclosure allows nodes 14 to generate data packets 28 having a substantially reduced size over traditional V2X authentication systems.

Figure 2:
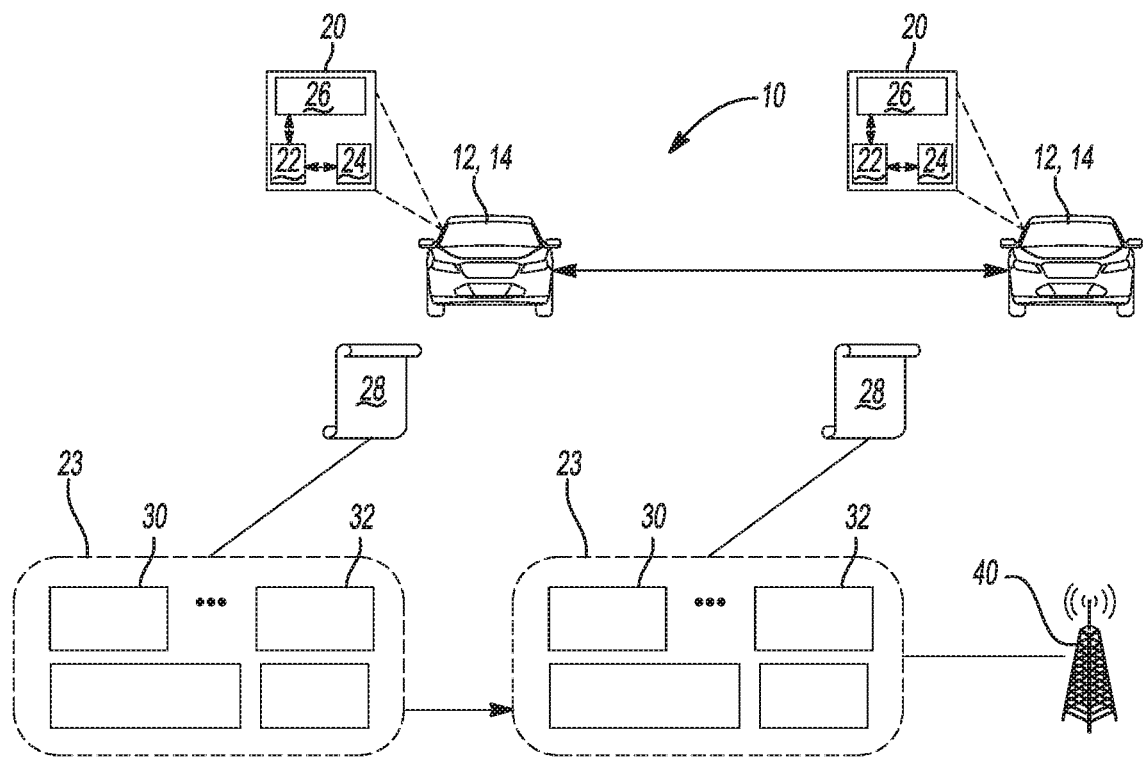
FIG. 2 is a schematic diagram of a blockchain enhanced V2X system having a network operator according to an aspect of the present disclosure.

Turning now to FIG. 2, and with continuing reference to FIG. 1, a the blockchain based V2X system 10 allows traffic participant nodes 14, such as motor vehicles 12, pedestrians 16, cyclists 18, mobile devices (not specifically shown), or grid infrastructure devices (not specifically shown) to communicate over the V2X system 10. Each of the traffic participant nodes 14 using the V2X system 10 generates a digital signature 33 with a public-private key pair when the V2X system 10 is initialized or launched. The digital signature 33 generated by the traffic participant nodes 14 does not depend on any third party authentication system or third party CA. The V2X communication module 20 periodically broadcasts a data packet 28 to the V2X system 10. In several aspects, the periodic data packet 28 broadcasts occur approximately once every few milliseconds, for example every 1, 10, 50, or 100 milliseconds, depending on the capabilities of the individual traffic participant nodes 14. The data packet 28 includes safety data 32 such as road condition information, traffic information, weather information, and the like. The data packet 28 also includes the digital signature having the header 30, a hash code, and the public key. In some examples, the public key is a portion of the header 30 described hereinabove. Thus, because the public key can be "shortened" by the use of a blockchain based authentication methodology rather than the use of a third party CA, the public key has a decreased size, and the overall data packet 28 size is reduced accordingly. The traffic participant nodes 14 which receive data packets 28 from surrounding traffic participant nodes 14 within a predetermined physical distance or range 34 will authenticate the digital signature 33 with the public key thereby guaranteeing that the safety data 32 has been sent by trusted entities within the V2X system 10 network. The authenticated data packet 28 message is used by the receiving traffic participant nodes 14 to perform various V2X functions, including data packet 28 message forwarding, generating notifications for V2X users viewable or otherwise retrievable through at least one human-machine interface (HMI) disposed on or in the participant nodes 14, and performing advanced driver assistance system (ADAS) functions, such as managing braking, steering, and throttle inputs in a motor vehicle 12.

The decreased size of the data packet 28 messages sent on the blockchain based V2X system 10 allow a bandwidth usage of the V2X system 10 to be optimized. That is, the smaller data packet 28 size allows a multitude of V2X system 10 data packet 28 messages to be sent by and among the V2X system 10 participant nodes 14 without approaching inherent bandwidth limitations of the V2X system 10. Additionally, the decreased size of the header 30 offers opportunities to increase a quantity of safety data 32 within the data packet 28. In one example, when a data packet size 28 of a V2X system 10 is set to a standard of 140 bytes per data packet 28 message, implementation of the blockchain based V2X system 10 with a predetermined 80 byte data packet 28 size on the same physical hardware and infrastructure provides an opportunity to utilize an additional 60 bytes of data for safety data 32 and other such information. In other words, the difference between the 140 byte traditional data packet 28 size and the new 80 byte data packet 28 is about 60 bytes. Accordingly, the 60 byte difference is used in some examples to increase a quantity of safety data 32 within the data packet 28.

Figure 3:
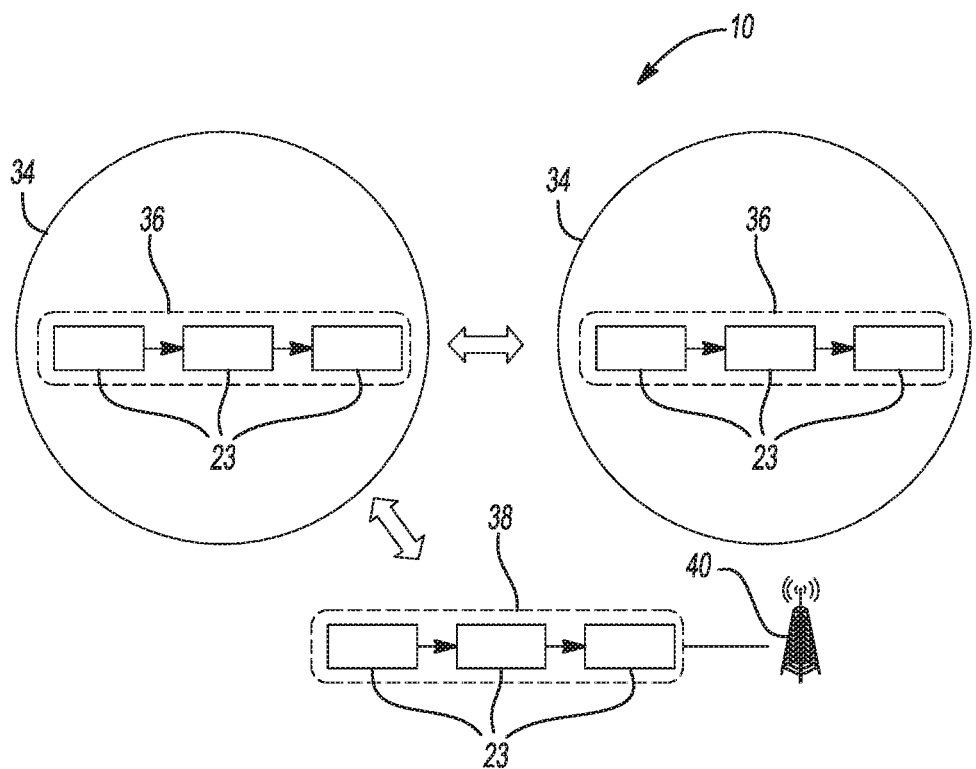
FIG. 3 is a schematic diagram of a blockchain enhanced V2X system using both public and private blockchains according to an aspect of the present disclosure.
Figure 4:
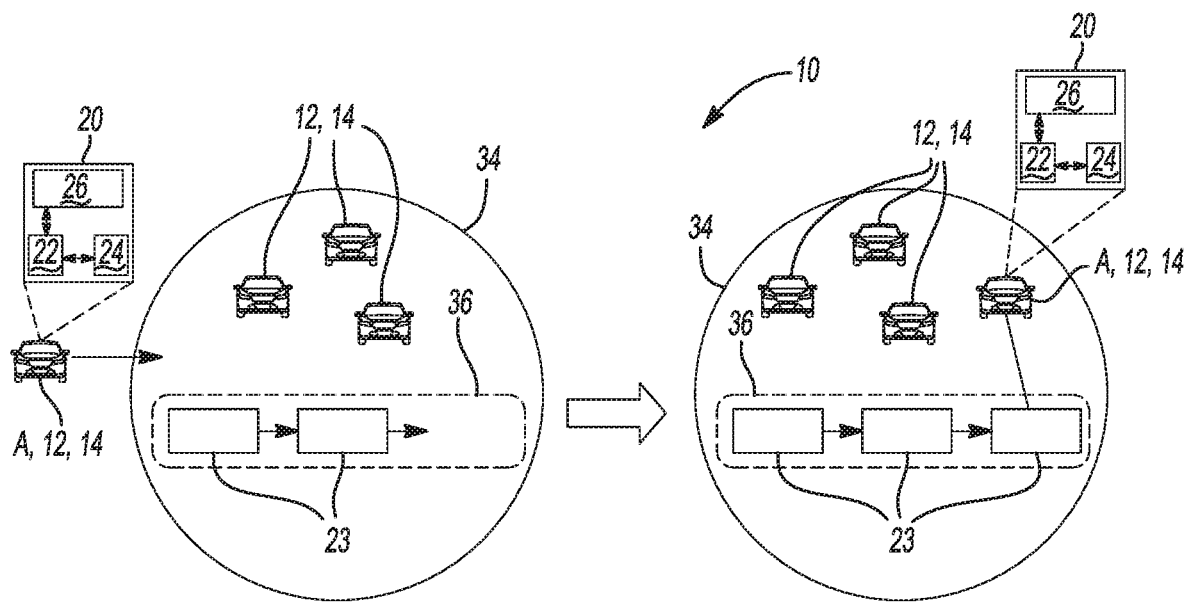
FIG. 4 is a schematic diagram of a blockchain enhanced V2X system including a V2X enabled motor vehicle joining the blockchain enhanced V2X system according to an aspect of the present disclosure.

Turning now to FIGS. 3 and 4, and with continuing reference to FIGS. 1 and 2, a the blockchain based V2X system 10 provides security for data packet 28 messages transmitted across the V2X system 10. In some examples, the predetermined distance or range 34 at which V2X system 10 data packets 28 or messages are transmitted is about 100 to about 300 meters. The predetermined distance or range 34 is utilized to determine which participant nodes 14 will participate in sending messages across the V2X system 10 network. In several aspects, the V2X system 10 utilizes a the V2X system 10 to create a private blockchain 36 within a limited range 34 or area. Node 14 devices, such as vehicle A in FIG. 4 generate requests to join the private blockchain 36 and the requests are received by and validated by participant node 14 devices within the private blockchain 36 to which the requesting device (i.e. vehicle A) has sent the access request. Once the participant nodes 14 within the private blockchain have received and validated the access request, the requesting node 14 device is granted access and becomes a part of the private blockchain 36. Authenticated participant nodes 14 then broadcast data packet 28 messages to the private blockchain 36. The private blockchain 36 has a relatively small size by comparison with a public blockchain 38, however the private blockchain 36 is fully featured. That is, the private blockchain 36 has computing resources for validating new blocks 23 in the private blockchain 36, and utilizes the V2X communications system 10 to broadcast and retrieve data packets 28.

The private blockchain 36 is generated dynamically within an optimized area 34 shared by multiple participant node 14 devices having V2X on board units (OBUs). Moreover, the private blockchain 36 covers certain types of traffic participants such as motor vehicles 12, pedestrians 16, cyclists 18, mobile devices (not specifically shown), or grid infrastructure devices (not specifically shown) to guarantee communication efficiency among the participating nodes 14. In order to avoid the potential for mass attack within the limited size of the private blockchain 36, the public blockchain 38 is utilized in the blockchain based V2X system 10 to enhance network security. In several aspects, the public blockchain 38 combines several smaller sized private blockchains 36 to optimize a flow of authentication. The public blockchain 38 has no limitations on location or hardware infrastructure. In some examples, the public blockchain 38 is distributed over the entire world, in satellites, and the like, and may be used mainly for other business purposes without departing from the scope or intent of the present disclosure. That is, because the public blockchain 38 is essentially a form of distributed computer, the computing resources and storage resources needed to operate the blockchain based V2X system 10 may be distributed across physical distance and hardware without deleteriously effecting the function and/or utility of the blockchain based V2X system 10. In some examples, network operators 40 providing hosting resources, such as computers, servers, or other such hardware devices, for use with the blockchain based V2X system 10 provide computing resources for participating nodes 14 in the private blockchain 36 having limited resources of their own. Thus, the hosting of private blockchain 36 participating nodes 14 by network operators 40 enhances the operation of the private blockchain 36 by offering increased computing resources and storage. Moreover, network operators 40 are motivated by participating in the blockchain based V2X system 10 to improve upon the operation of the blockchain based V2X system 10 by offering value-added services. The value-added services may take any of a variety of forms, but generally assist in supporting the blockchain based V2X system 10 by providing computing resources.

Figure 5:
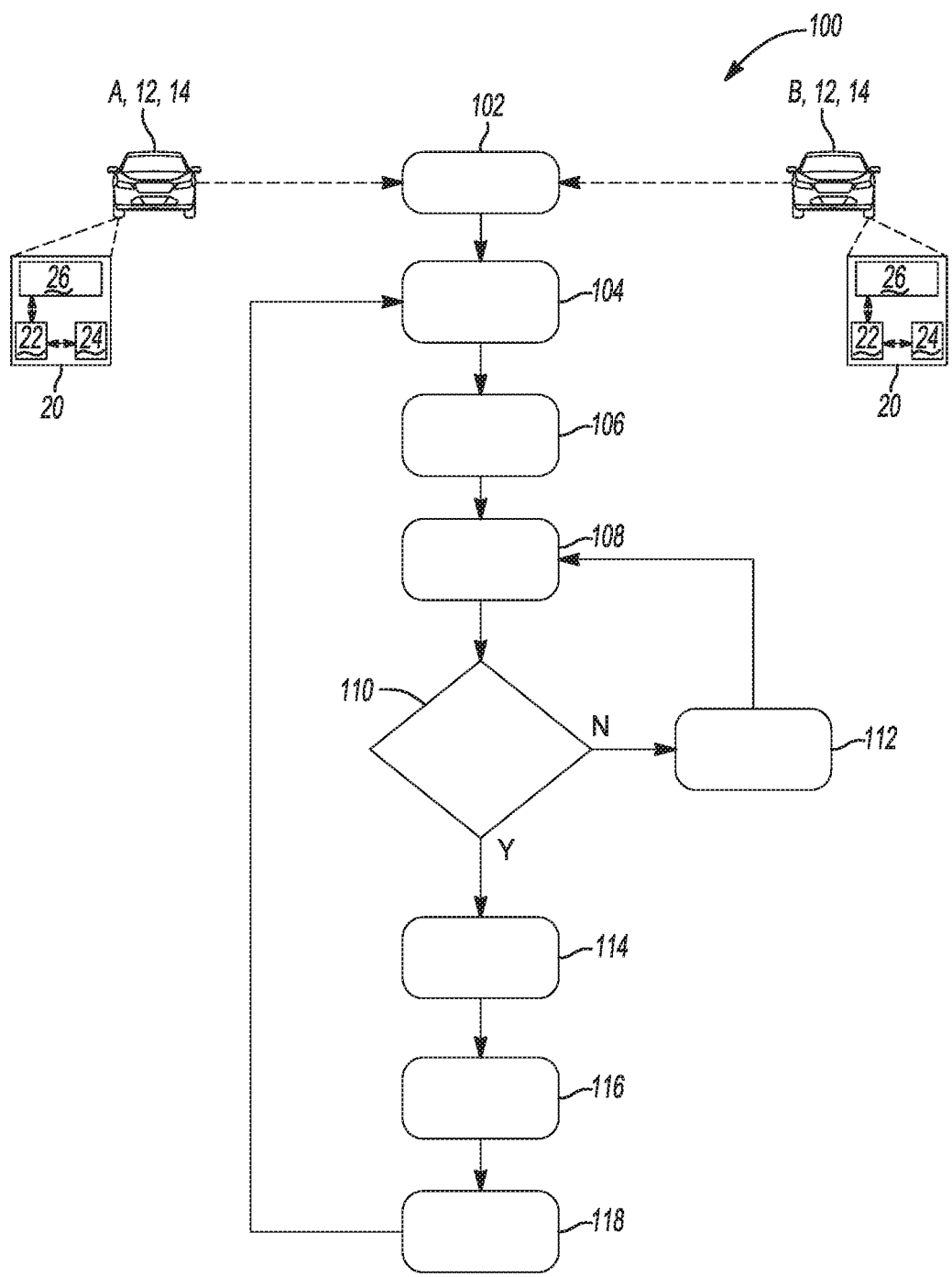
FIG. 5 is a flow diagram depicting a method of using a blockchain enhanced V2X system according to an aspect of the present disclosure.

Turning now to FIG. 5, and with continuing reference to FIGS. 1-4, an exemplary method of operation of the blockchain based V2X system 10 is shown and generally indicated by reference number 100. The method 100 begins at block 102 where a vehicle A and vehicle B generate a private key and a public key locally without the use of a third party CA. At block 104, vehicles A and B generate a request to join a private blockchain 36. The private blockchain 36 is dynamically generated within an optimized area 34, for example, a 100 to 300 meter radius of each of vehicle A and vehicle B. At block 106 vehicle A generates a broadcasting data packet 28. The data packet 28 includes a V2X message such as safety data 32 and a digital signature 33. In one example, the V2X safety data 32 includes a position, a speed, an acceleration, a direction, a time, safety events, and the like for each of the participant nodes 14 which sends a data packet 28. The digital signature 33 includes a blockchain header, a hash code, and the public key. Because the digital signature 33 does not need to include a certificate from a third party CA, the digital signature 33 has a small size, as discussed hereinabove. At block 108, vehicle B receives the data packet 28 transmitted across the blockchain based V2X system 10 from vehicle A. At block 110, vehicle B pursues a validation procedure with low latency. That is, upon receiving the data packet 28 from vehicle A, vehicle B attempts to validate the data packet 28 sender and data within a few milliseconds of receipt. In several aspects, the validation procedure includes: requesting validation that the data packet 28 was transmitted by a participating node 14 within the private blockchain 36 to which vehicle B also belongs; causing the private blockchain 36 to forward the validation request to a delegated resource in the public blockchain 38 to which the private blockchain 36 belongs if necessary; and utilizing a public blockchain 38 to synchronize data and bounce a validation result back to vehicle B for quick validation. If at block 110 the validation procedure fails to validate the data packet 28 as being from a trustworthy source (i.e. vehicle A), the method 100 proceeds to block 112 where vehicle A is added to an untrusted list and the method 100 returns to block 108 where vehicle B waits for the next broadcast data packet 28 from the private blockchain 36 of the blockchain based V2X system 10. From block 112, the method 100 returns to block 108. If, however, the validation procedure successfully validates the data packet 28 at block 110, the method 100 proceeds to block 114 where upon confirming the validation of the data packet 28 from vehicle A, vehicle B consumes and analyzes the data packet 28. At block 116, if necessary, vehicle B responds to the safety data 32 within the data packet 28 by generating warning messages for users of affected motor vehicles 12 via HMIs disposed within the motor vehicles 12, or in some examples by triggering active safety features such as ADAS functions based on the validated content of the V2X data packet 28 from vehicle A. At block 118, vehicles A and B are selectively and dynamically unregistered from the private blockchain 36 upon leaving the predefined optimized physical area 34. From block 118, the method 100 returns to block 104 where each of vehicles A and B continue to generate requests to join the nearest private blockchain 36 within an optimized area 34 of each of vehicles A and B.

Figure 6:
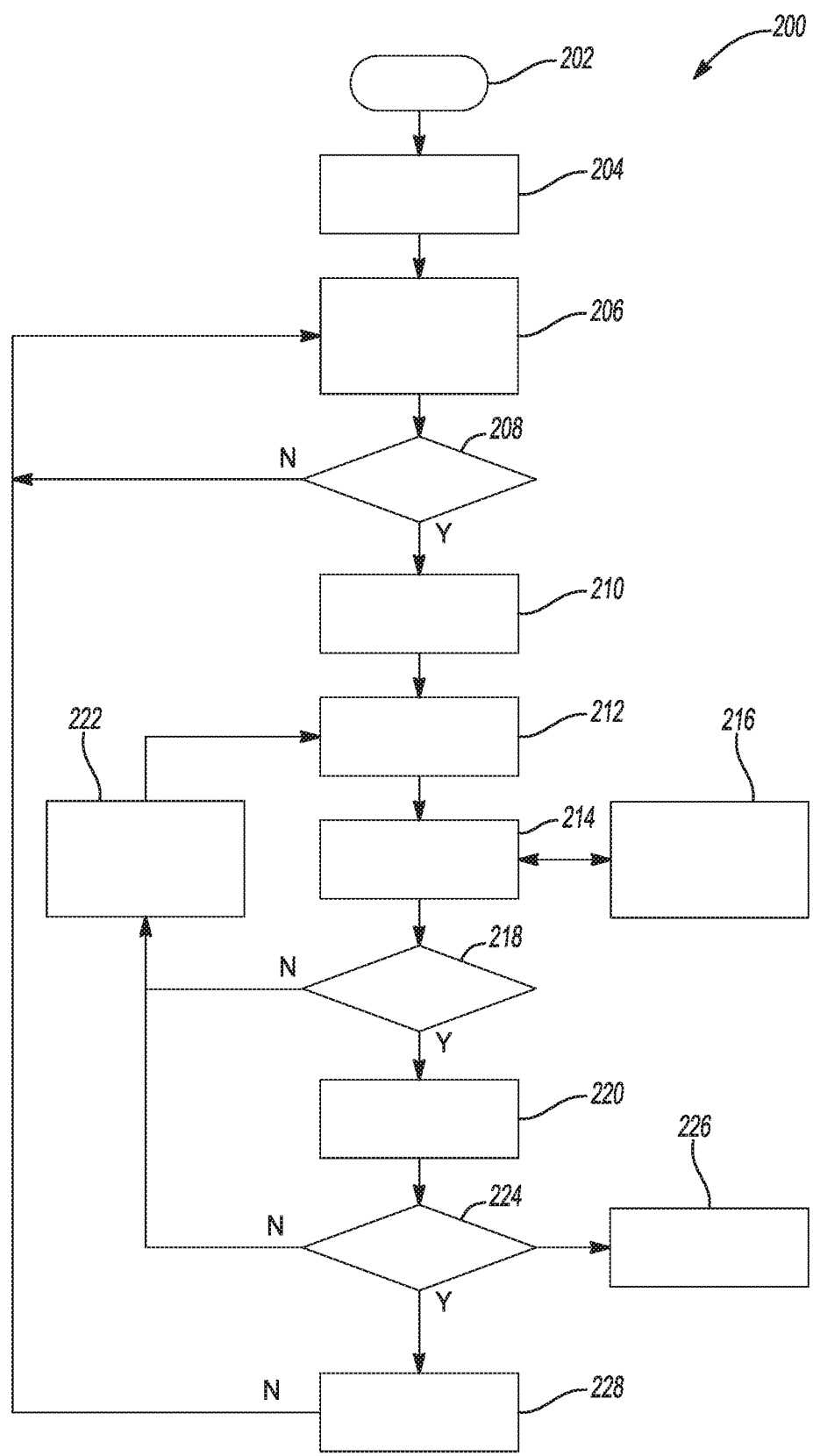
FIG. 6 is a flow diagram depicting a method of using a blockchain enhanced V2X system according to another aspect of the present disclosure.

Turning now to FIG. 6, and with continuing reference to FIGS. 1-5, another exemplary method of operation of the blockchain based V2X system 10 is shown and indicated generally by reference number 200. The method 200 begins at block 202 where vehicle A is turned on and initializes communication with the blockchain based V2X system 10. At block 204, in preparation to joint the blockchain based V2X system 10, vehicle A generates a private key and a public key locally. At block 206, vehicle A generates a request to join the nearest private blockchain 36 within an optimized area 34. In several aspects, and as described hereinabove, the optimized area 34 is a radius of approximately 100 to 300 meters from vehicle A. At block 208, if vehicle A successfully joins the private blockchain 36 of the blockchain based V2X system 10, the method 200 proceeds to block 210. However, if vehicle A is not successful in joining the private blockchain 36, the method 200 returns to block 206 where vehicle A again generates a request to join the nearest private blockchain 36. At block 210, vehicle A broadcasts a data packet 28 including a V2X message, such as safety data 32, and a digital signature 33 uniquely identifying vehicle A. At block 212, the blockchain based V2X system 10 receives not only the data packet 28 from vehicle A, but data packets 28 from any of a variety of additional V2X participant nodes 14, such as other motor vehicles 12 like vehicle B in the example of FIG. 6, pedestrians 16, cyclists 18, mobile devices (not specifically shown), or grid infrastructure devices (not specifically shown). At block 214, the blockchain based V2X system 10 raises a validation procedure within the private blockchain 36. In some examples additional computing resources may be required, and the request to join, as well as the data packet 28 from vehicle A is forwarded to a delegated resource in a public blockchain 38 at block 216. At block 218 if the data packets 28 have been properly validated, the method proceeds to block 220 where the contents of the data packets 28 are analyzed. That is, at block 220, the public-private key pair is hash checked, and the V2X data packet's 28 safety data 32 is extracted. In several aspects, the safety data 32 is extracted in a raw format to be used by various ADAS systems in a motor vehicle 12 or by ADAS systems or other systems in other participant nodes 14. If, however, at block 218 the data packet 28 is not properly validated, the method proceeds to block 222 where whichever participant node 14 has generated the unvalidated data packet 28 is added to an untrusted list, and the blockchain based V2X system 10 waits for the next message to be sent and/or received. From block 222, the method 200 returns to block 212 where the blockchain based V2X system 10 receives not only the data packet 28 from vehicle A, but data packets 28 from any of a variety of additional V2X participant nodes 14, such as other motor vehicles 12 like vehicle B in the example of FIG. 6, pedestrians 16, cyclists 18, mobile devices (not specifically shown), or grid infrastructure devices (not specifically shown) once more. Referring once more to block 220, if the extraction of the safety data 32 and public-private pair hash check is unsuccessful, the method proceeds to block 222, and then block 212 as described above. However, if the extraction of safety data 32 and public-private pair hash check is successful, the method 200 proceeds from block 224 to one of either block 226 or block 228. If the extraction of safety data 32 and the public-private pair hash check is successful, the method proceeds to block 226 where a warning is generated for a user of vehicle A via a human-machine interface, such as a navigation screen, a dashboard instrument cluster, or the like. In some examples, either alone or in combination with the warning, an ADAS system may be engaged to appropriately utilize the safety data 32 within vehicle A. In addition, if at block 224 the extraction of safety data 32 and the public-private pair hash check is successful, in some examples, the method 200 proceeds to block 228 where vehicle A is dynamically unregistered in the current private blockchain 36 if vehicle A moves outside of the optimized predefined physical area 34 of the current private blockchain 36. The method 200 then proceeds from block 228 back to block 206 where vehicle A generates a request to join the nearest private blockchain 36 within an optimized area 34.

A blockchain enhanced V2X communication system and method of the present disclosure offer several advantages including providing security necessary to operate a trustworthy V2X system for motor vehicles while reducing cost, decreasing infrastructure requirements, decreasing complexity, and increasing stability, scalability, and safety while maintaining or improving security of V2X networks.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. An authentication system for a vehicle to everything (V2X) communication system comprising:
    a first participant node, the first participant node having a V2X communication module with a processor, a memory, and input/output ports, the input/output ports communicating a request to join the V2X communication system, and the input/output ports periodically communicating a first data packet to the V2X communication system;
    a private blockchain including a plurality of participant nodes within a predefined optimized physical area of one another, the private blockchain receiving the request to join the V2X communication system from the first participant node, the private blockchain validating the request to join the V2X communication system, and upon successfully validating the request to join the V2X communication system, the private blockchain periodically sends a second data packet from the plurality of participant nodes to the first participant node;
    a public blockchain having a plurality of decentralized computing resources, wherein the first and second data packets are selectively forwarded to the public blockchain when computing resources of the private blockchain are below a predetermined threshold value, wherein the public blockchain comprises a plurality of private blockchains; and
    the input/output ports receiving the second data packet, the processor executing a first control logic stored in the memory to extract the second data packet and a second control logic selectively generating a notification based on contents of the second data packet.

2. The authentication system for a V2X communication system of claim 1 wherein the first data packet and the second data packet each comprise a V2X message and a digital signature.

3. The authentication system for a V2X communication system of claim 2 wherein the V2X message comprises a position, a speed, an acceleration, a direction, a time, and safety event information, and wherein the digital signature comprises a blockchain header, a hash code, and a public key.

4. The authentication system for a V2X communication system of claim 1 wherein the plurality of decentralized computing resources of the public blockchain are remotely located from the participant nodes of the private blockchain, and remotely located from the plurality of private blockchains.

5. The authentication system for a V2X communication system of claim 1 wherein the processor executes a third control logic determining a physical location of the first participant node in relationship to the predefined optimized physical area and dynamically unregistering the first participant node when the first participant node is no longer within the predefined optimized physical area, and wherein the processor executes a fourth control logic selectively adding the first participant node to a list of untrusted resources when the request to join the V2X communication system is not successfully validated.

6. The authentication system for a V2X communication system of claim 1 wherein the first participant node comprises a motor vehicle, a pedestrian, a cyclist, a mobile device, or a grid infrastructure device.

7. The authentication system for a V2X communication system of claim 1 wherein the second control logic further comprises selectively generating the notification to a human-machine interface (HMI) of the first participant node, and selectively performing an advanced driver assistance system (ADAS) function based on the contents of the second data packet.

8. A method of authentication for a vehicle to everything (V2X) communication system comprising:
generating a request to join the V2X communication system within a V2X communication module of a first participant node, the V2X communication module having a processor, a memory, and input/output ports;
communicating the request to join the V2X communication system from the input/output ports of the first participant node;
periodically communicating a first data packet to the V2X communication system from the input/output ports of the V2X communication module of the first participant node;
receiving the request to join and the first data packet within a private blockchain including a plurality of participant nodes within a predefined optimized physical area of one another;
validating the request to join the V2X communication system within the private blockchain;
selectively joining the first participant node to the private blockchain upon successfully validating the request to join;
periodically sending a second data packet generated by the plurality of participant nodes of the private blockchain to the first participant node;
receiving the second data packet with the input/output ports of the first participant node;
extracting the second data packet within the processor of the V2X communication module of the first participant node;
selectively forwarding the first data packet and the second data packet to a public blockchain having a plurality of decentralized computing resources when computing resources of the private blockchain are below a predetermined threshold value, wherein the public blockchain comprises a plurality of private blockchains; and
selectively generating a notification based on contents of the second data packet.

9. The method of authentication for a V2X communication system of claim 8 wherein the first data packet and the second data packet comprise a V2X message and a digital signature.

10. The method of authentication for a V2X communication system of claim 9 wherein the V2X message comprises a position, a speed, an acceleration, a direction, a time, and safety event information, and wherein the digital signature comprises a blockchain header, a hash code, and a public key.

11. The method of authentication for a V2X communication system of claim 8 wherein the decentralized computing resources of the public blockchain are remotely located from the participant nodes of the private blockchain, and remotely located from the plurality of private blockchains.

12. The method of authentication for a V2X communication system of claim 8 further comprising determining a physical location of the first participant node in relationship to the predefined optimized physical area and dynamically unregistering the first participant node when the first participant node is no longer within the predefined optimized physical area.

13. The method of authentication for a V2X communication system of claim 8 wherein the first participant node comprises a motor vehicle, a pedestrian, a cyclist, a mobile device, or a grid infrastructure device.

14. The method of authentication for a V2X communication system of claim 8 further comprising generating a notification to a human-machine interface (HMI) of the first participant node, and selectively performing an advanced driver assistance system (ADAS) function based on the contents of the second data packet.

15. The method of authentication for a V2X communication system of claim 8 further comprising selectively adding the first participant node to a list of untrusted resources when the request to join the V2X communication system is not successfully validated.

16. A method of authentication for a vehicle-to-everything (V2X) communication system comprising:
generating a request to join the V2X communication system within a V2X communication module of a first participant node, the V2X communication module having a processor, a memory, and input/output ports;
communicating the request to join the V2X communication system from the input/output ports of the first participant node;
periodically communicating a first data packet to the V2X communication system from the input/output ports of the V2X communication module of the first participant node;
receiving the request to join and the first data packet within a private blockchain including a plurality of participant nodes within a predefined optimized physical area of one another;
validating the request to join the V2X communication system within the private blockchain;
selectively joining the first participant node to the private blockchain upon successfully validating the request to join;
selectively adding the first participant node to a list of untrusted resources when the request to join the V2X communication system is not successfully validated;
periodically sending a second data packet generated by the plurality of participant nodes of the private blockchain to the first participant node, wherein the first data packet and the second data packet each comprise a V2X message comprising a position, a speed, an acceleration, a direction, a time, and safety event information, and a digital signature comprising a blockchain header, a hash code, and a public key;

selectively forwarding the first data packet and the second data packet to a public blockchain having a plurality of decentralized computing resources when computing resources of the private blockchain are below a predetermined threshold value, the public blockchain comprising a plurality of private blockchains, and the plurality of decentralized computing resources of the public blockchain are remotely located from the participant nodes of the private blockchain, and remotely located from the plurality of private blockchains;

receiving the second data packet with the input/output ports of the first participant node;

extracting the second data packet within the processor of the V2X communication module of the first participant node;

selectively generating a notification to a human-machine interface (HMI) of the first participant node, and selectively performing an advanced driver assistance system (ADAS) function based on contents of the second data packet; and determining a physical location of the first participant node in relationship to the predefined optimized physical area and dynamically unregistering the first participant node when the first participant node is no longer within the predefined optimized physical area.

* * * * *